Dec. 3, 1957 S. G. ESKIN ET AL 2,815,035
GAS TEMPERATURE SHUT OFF VALVE
Filed Oct. 21, 1954
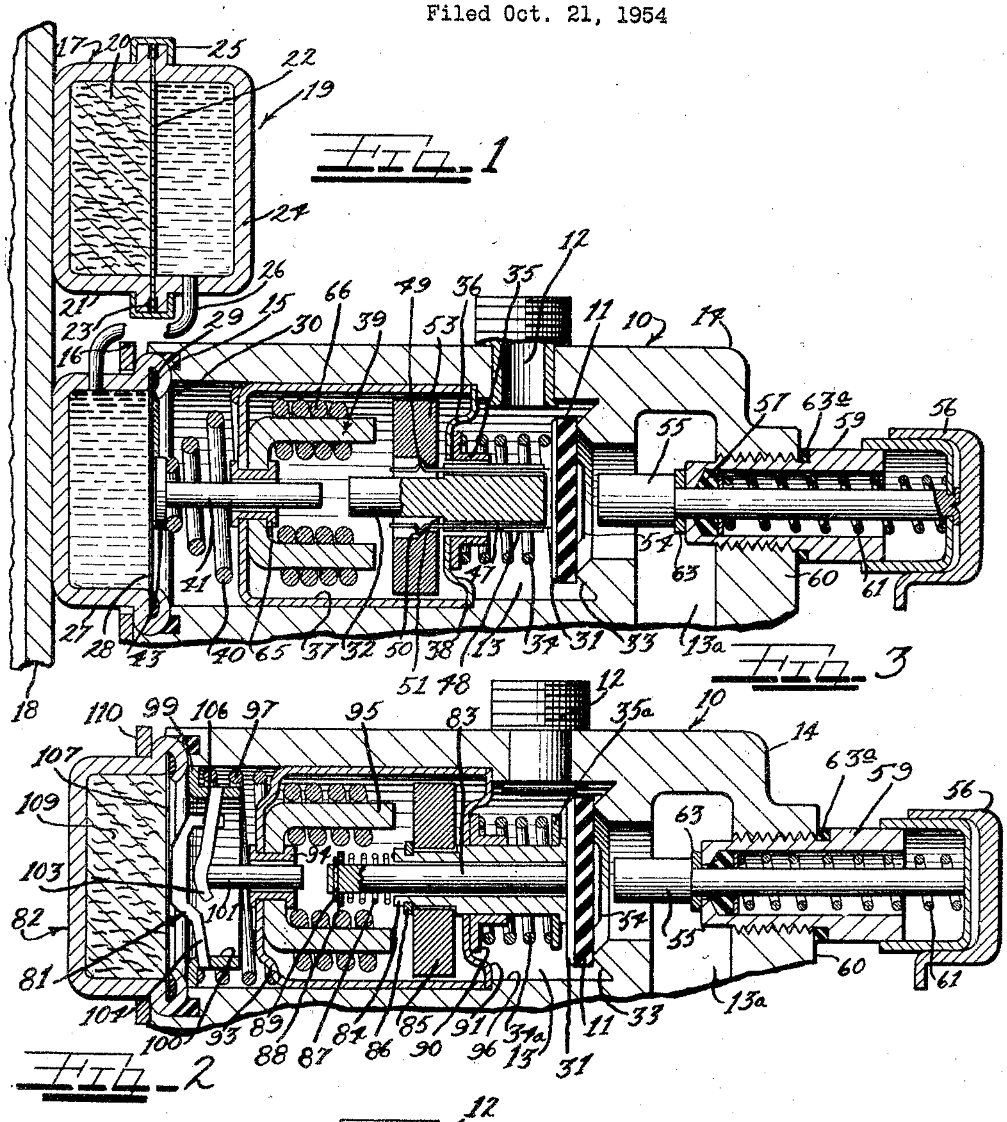
FIG. 1, FIG. 3, FIG. 2
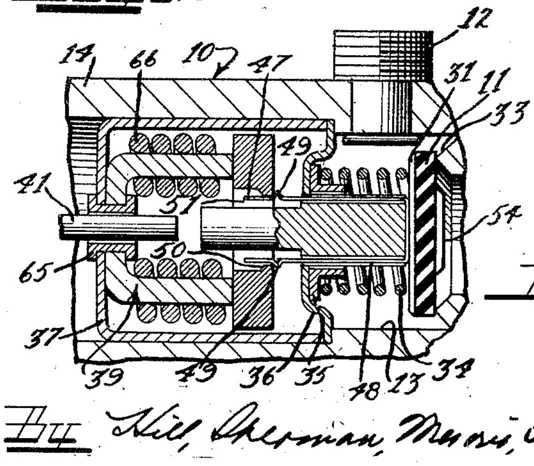
Inventors
Samuel G. Eskin
Thomas B. Legeza
By Hill, Sherman, Meroni, Gross & Simpson Attys

United States Patent Office 2,815,035
Patented Dec. 3, 1957

2,815,035

GAS TEMPERATURE SHUT OFF VALVE

Samuel G. Eskin, Chicago, and Thomas B. Legeza, Westchester, Ill., assignors to The Dole Valve Company, Chicago, Ill., a corporation of Illinois Application October 21, 1954, Serial No. 463,726

12 Claims. (Cl. 137—65)

This invention relates to improvements in valves particularly adapted to control the supply of gas to a main gas burner valve and like devices and to shut off the flow of gas at the main gas burner valve upon over-temperature conditions.

A principal object of the invention is to provide a simple and positively acting shut-off for a gas supply valve, automatically shutting off upon over-temperature conditions.

Another object of the invention is to provide a safety shut-off valve for gas burners in which the valve is held open by thermal electric current generated by the heat of the pilot flame, and in which a thermostatically operated over-temperature safety release is provided for the valve, positively releasing the valve upon over-temperature conditions while the electromagnet holding the valve open is maintained energized.

Another object of the invention is to provide a simple and positive shut-off valve for shutting off the supply of gas to a main and a pilot burner upon over-temperature conditions, in which an electromagnet energized by thermal electric current generated by the heat of the pilot flame holds the valve open by engagement with an armature connected with the valve, and in which a yieldable connection is provided between the armature and valve to accommodate a thermostatic element to move the valve against its yieldable connection to a closed position while the armature remains in engagement with its electromagnet.

A further object of the invention is to provide a new and improved form of resettable gas supply valve, particularly adapted to supply gas to a main gas burner in which an armature is releasably connected to the valve and an electromagnet energized by thermal electric current generated by the heat of the pilot flame serves to hold the valve in an open position, and in which a power member operated by a thermostatic element operates to release the releasable connection between the armature and valve, and accommodate the biasing spring for the valve to move the same to a closed position.

Still another object of the invention is to provide a flame safety over-temperature gas shut off valve in which an over-temperature thermostat for shutting off the valve is remote from the valve proper.

Still another object of the invention is to provide a thermostatically operated valve held open by thermal electric current by an electromagnet engaging an armature, having connection with the valve, and providing a thermostatically operated release for the valve, releasing the valve from its armature to be moved to a closed position while the armature therefor is still in engagement with its electromagnet.

These and other objects of the invention will appear from time to time as the following specification proceeds and with reference to the accompanying drawings wherein:

Figure 1 is a partial fragmentary sectional view taken through a safety burner valve and showing a flame and over-temperature safety shut off valve constructed in accordance with our invention;

Figure 2 is a partial fragmentary sectional view somewhat similar to Figure 1 but showing the valve closed with the holding armature therefor in engagement with the thermocouple magnet; and Figure 3 is a fragmentary sectional view somewhat similar to Figure 1, with the main burner valve broken away, and illustrating a modified form in which our invention may be embodied.

In embodiment of the invention illustrated in Figure 1 of the drawing, we have shown generally a portion of a main burner valve 10 of a type controlling the supply of gas to a pilot burner and a main burner. The valve 10 includes a valve body 14 having a valve chamber 13 therein, with a flame safety and over-temperature shut-off valve 11, controlling the flow of gas from an inlet 12 into said valve chamber 13 through an outlet 13a leading from said valve chamber. The outlet 13a may be a part of the valve body of a main gas valve (not shown).

The valve 10 is of a type which may be advantageously used to control the temperature of water in a hot water heater, and which may be strapped to the heater with an over-temperature thermostatic element 17 remote from the valve, strapped into engagement with a wall 18 of the hot water heater and transferring power to the valve through fluid transfer means 19, as will hereinafter more clearly appear as this specification proceeds.

The thermostatic element 17 is herein shown as being a wax or power type of thermostatic element in which a fusible thermally expansible material or medium 20 is contained within a non-deformable casing 21 by a flexible diaphragm 22. The fusible thermally expansible material may be a wax alone, or a wax and a metal wool, or a wax mixed with a metal powder and a binder, forming a semi-plastic fusible mass, expanding when the temperature to which the medium is subjected reaches the fusion temperature of the wax. The casing 21 is shown as being flanged, and the flanged portion thereof is abutted by a seal 23 engaging the flexible diaphragm 22. The diaphragm 22 also encloses and is sealed to a container 24, shown as being similar in form to the casing 21 and containing a power transfer medium therein. A band 25 is shown as encircling the flanges of the casings 21 and 24 and as being spun inwardly along the flanges thereof to retain the casings 21 and 24 together and to seal the same.

The casing 24 may contain a suitable power transferring fluid such as oil and is shown as having a tube 26 connected thereto and leading therefrom to the casing 27 closing the end of the valve chamber 13. The casing 27 is closed by a flexible diaphragm 28, sealed thereto by an annular seal 29 pressed into engagement therewith by an inwardly spun flange 30 of the casing 27. The casing 27 is sealed to the end of the valve body 14 by an annular seal 15 and is held in engagement therewith by a yoke 16, encircling the casing 27 and bolted or otherwise secured to the end of the valve body.

It should here be understood that the casings 24 and 27 as well as the tube 26 are completely filled with fluid when the thermostatic device is installed, so the diaphragm 28 will be extended from its casing substantially the same amount the diaphragm 22 is extended from its casing.

The valve 11 is shown as being in the form of a resilient annular disc carried on a metal backing plate 31 on the upper end of a plunger 32. The valve disc is shown as being biased into engagement with an annular valve seat 33 by means of a compression spring 34 seated at one end on the backing plate 31, and at its opposite end on the flange of a flanged collar 35, abutting an annular saddle 36 forming an end closure member for casing 37 for a thermal electromagnet 39. The saddle 36 is shown as being retained in position within the valve chamber 13 by the casing 37 engaging the saddle with a shoulder 38 in the chamber 13. A compression spring 40, herein shown as being a conical spring, encircles a power member or plunger 41 operated by the diaphragm 28 and has engagement with a head 43 of said power member at one end and the bottom of the casing 37 at its opposite end, to return the diaphragm 28 of the motion transferring means 19.

The depending plunger or valve stem 32 is shown as being in axial alignment with the power member 41 and is engaged by the same, when the valve is in its open position, to release the valve 11 to be moved to its biased position into engagement with the seat 33 upon over temperature conditions, and extension of the diaphragm 28 from the casing 27.

A generally U-shaped spring 47 is carried on the plunger or valve stem 32. The base of the spring extends across the plunger 32 and the legs thereof extend downwardly along opposite sides of said plunger within slotted guides 48, 48 extending therealong. The legs of the U-shaped spring 47 are shown as having transverse detent projections or ribs 49, 49 extending outwardly therefrom adjacent the lower ends thereof, for engagement with angular shouldered portions 50 formed in a central bore or passageway 51 of an armature 53 engageable with the poles of the electromagnet 39.

The opposite end of the valve 11 from the stem 32 is shown as having an upwardly projecting metallic disc 54 which may be a part of the disc 31 and is adapted to be abutted by a plunger 55 depending from a reset button 56. The plunger 55 has a reduced diameter upper end portion slidably guided in a seal 57 fitting within a guide retainer sleeve 59, shown as being threaded in a wall 60 of the valve casing 14. The button 56 is slidably guided on the outer surface of the sleeve 59 and a compression spring 61 is shown as being interposed between the seal 57 and the under surface of the button 56 for biasing the plunger 55 in the position shown in Figure 1. A gasket 63 is also shown as being mounted on the reduced diameter portion of the plunger 55 and abutting the enlarged diameter portion thereof and the inner side of the guide or retainer sleeve 59, to further seal said retainer and prevent the leakage of gas therethrough. The retainer sleeve 59 is sealed to the valve body 14 by a seal **63*a***.

Upon depression of the set button 56 and the plunger 55 into engagement with the disc 54, the valve 11 will be moved out of engagement with the seat 33 into an open position. The valve 11, stem 32, spring 47 and armature 53 will move downwardly as a unit until said armature comes into engagement with the electromagnet 39. The valve will then be held open as long as the electromagnet 39 is energized, the detent ribs 49, 49 engaging the shoulder in the bore or passageway 51 through the armature 53 with sufficient pressure to hold the valve 11 open against the bias of the spring 34.

The electromagnet 39 is herein shown as having a generally U-shaped core, the poles of which face the armature 53. The electromagnet 39 is mounted on a flanged collar 65 carried in the bottom of the casing 37, and also forming a guide for the power member 41. Coils 66 are shown as being wound around the poles of the magnet 39. The coils 66, 66 may be connected to a thermocouple (not shown), the tip of which may be positioned adjacent a pilot burner (not shown) and heated by the presence of a pilot flame, to generate thermal electric current and energize the electromagnet 39.

The coils 66, 66 are thus energized to hold the armature 53 in engagement with the poles of the electromagnet 39 as long as the pilot flame is burning, but release the armature 53 to accommodate the valve to be closed by the biasing spring 34, if for any reason the pilot flame should go out and the thermocouple temperature should be reduced to a point where the spring 34 overcomes the magnetic force of the electromagnet 39. The electromagnet 39 thus releases the gas valve 11 to be closed by the spring 34 when the pilot flame is out.

When the set button 56 has been depressed, to disengage the valve 11 from the annular seat 33 and bring the armature 53 into engagement with the poles of the electromagnet 39, and the pilot has been ignited and is generating sufficient thermal electric current to maintain the armature 53 in engagement with the electromagnet 39 against the force of the spring 34, the armature 53 will normally hold the valve 11 open as long as the pilot burner is lit.

When however, the temperature to which the thermostatic element 17 is subjected, rises beyond a predetermined safe temperature, the fusible material 20 in the casing 21 will be heated to its fusion point, and extend the metal diaphragm or disc 22 from the casing 21. This will transfer fluid from the casing 24, through the tube 26 to the casing 27 and extend the diaphragm 28 from the casing 27. The power member 41 will thus be extended by the diaphragm 28 to come into engagement with the end of the plunger 32. Upon further expansion of the fusible material, the power member 41 will positively move the stem 32 upwardly with respect to the armature 53, forcing the legs of the spring 47 inwardly and releasing said spring from said armature 53. The spring 34 will then positively close the valve 11.

It should here be understood that the restraining force of the spring 47 is considerably less than the force with which the armature 53 is attracted to the magnet 39. Thus, upon over-temperature conditions, the valve is released from the armature 53 and the armature is maintained in contact with the magnet until the thermocouple cools as shown in Figure 2. The armature will then become loose. The lower end portions of the legs of the spring 47, however, remain in engagement with the bore through the armature. Thus when resetting the valve the push button 56 is depressed and first moves the spring 47 inwardly along the armature 53 until the ribs 49, 49 of the spring 47 engage the shouldered portion 50 of said armature.

It should further be understood that if the pilot flame should go out and the electromagnet 39 should be deenergized that the spring 47 will cause the armature 53 to move with the stem 32 and the valve 11 as the valve moves to a closed position.

In the modified form of our invention illustrated in Figure 3 of the drawings, the valve 11 is moved with respect to an armature 85 through an amplifying lever system 81 actuated by a thermostatic element 82. The valve 11, seat 33, the plunger 55 and set button 56 for setting the valve to an open position are the same as the valve in the form of my invention illustrated in Figure 1, so like part numbers will be applied to like parts.

The valve 11 is shown as having a stem 83 extending therefrom within a sleeve 84 having an armature 85 at its inner end. The armature 85 is shown as being retained to the sleeve 84 by snap ring 86. A spring 87 on the stem 83 is seated against the end of the sleeve 84 at one end, and against a collar 88 at its opposite end, and biases the sleeve 84 into engagement with the valve 11. A snap ring 89 is provided to retain the collar 88 to the end of the stem 83. The sleeve 84 is shown as being slidably guided in a flanged collar 90 like the flanged collar 35, and carried on an annular carrier 91, herein shown as being an end wall of a generally cylindrical casing 93, for an electromagnet 95. A spring **34*a* encircles the sleeve 84 and is interposed between the flange of the collar 90 and washer 35*a* to bias the sleeve 84** in a valve closing direction.

The casing 93 is carried within a valve chamber 96 in axial alignment with the valve seat 33. The casing 93 is shown as being retained within the chamber 96 by a spring 97, abutting the end wall of said casing at one of its ends and a flange 99 of a flanged collar 100 at its opposite end.

The electromagnet 95 is like the electromagnet 39 and is carried within the casing 93 on a flanged collar 94, having a power member or plunger 101 slidably guided therein, for engagement with the end of the valve stem or plunger 83.

The power member 101 is shown as being carried at its end opposite the stem or plunger 83 on the end of an amplifying lever 103 of the amplifying lever system 81. The amplifying lever system is similar to that shown and described in our joint application Serial No. 451,185, filed Aug. 19, 1954, and entitled "Thermal Responsive Element" and includes the amplifying lever 103 fulcruming about its outer end in the wall of the collar 100, and a reaction lever 104 pivotally carried in the wall of the collar 100 in diametrically opposed relation to the fulcrum point of the amplifying member 103. The reaction lever 104 is shown as having fulcrum points 106 engaging the amplifying lever 103 inwardly of the wall of the collar 110 and as engaging a thin metal diaphragm 107 of the thermostatic element 82 intermediate its ends.

The diaphragm 107 is shown as closing the end of the thermostatic element 82 and retaining a fusible thermally expansible material 109 therein, which expands when the temperature to which the thermostatic element is subjected reaches the range of fusion of the fusible material. This will extend the diaphragm 107 and pivot lever 104 about its fulcrum point and in turn pivot the amplifying lever 103 about its fulcrum point to extend the power member 101 a sufficient distance to bring the valve 11 into engagement with its seat 33 against the spring 87, while the armature remains in engagement with the electromagnet 95.

The thermostatic element 82 is shown as being retained to the end of the valve body 14 by a yoke 110 engaging a shouldered portion of the casing of the thermostatic element 82 and bolted or otherwise secured to the end of the valve body 14.

It may be seen from the foregoing that upon the depression of the set button 56, the set plunger 55 will engage the valve 11 and move said valve out of engagement with its seat 33. The sleeve 84 and armature 85 will move inwardly with the valve, the armature coming into engagement with the electromagnet 95, as in the form of our invention illustrated in Figure 1. Upon the ignition of the pilot flame and the generation of sufficient thermal electric current to energize the electromagnet 95 with sufficient force to retain the armature 85 thereto, the electromagnet 95 will hold the valve 11 open during normal temperature conditions as long as the pilot is ignited.

In cases, however, where the temperature to which the thermostatic element 82 is subjected becomes excessive, the fusible material 109 of the thermostatic element 82 will extend the diaphragm 107 from its casing and thus extend the power member 101 through the amplifying lever system 81 to engage the end of the plunger 83. Further extension of the diaphragm 107 will positively move the valve 11 into engagement with the seat 33. As the pilot flame is extinguished by shutting off the flow of gas through the seat 33, the tip of the thermocouple will cool, deenergizing the electromagnet 95 and accommodating the spring 34*a* to move the sleeve 84 into engagement with the valve 11 and return the armature 85 to the position shown in Figure 3.

It will be understood that modifications and variations in the present invention may be effected without departing from the spirit and scope of the novel concepts thereof.

We claim as our invention:

1. In a safety device for gas burners, a valve body having a valve chamber therein, an inlet into said chamber, an outlet from said chamber, a valve in said chamber controlling the passage of gas from said inlet to said outlet, means manually operable for moving said valve to open position, magnet means energized by thermal electric current for holding said valve open, including an electromagnet and an armature movable with said valve into engagement with said magnet upon movement of said valve to an open position, for holding the valve open, and a releasable connection between said valve and said armature, accommodating said valve to be released from said armature and moved to a closed position while said magnet means remains energized.

2. In a flame safety and over temperature shut-off device for gas burners, a valve body having a valve chamber therein, an inlet into said chamber, an outlet from said chamber, a valve controlling the passage of gas from said inlet to said outlet, spring means biasing said valve into closed position, magnet means holding said valve open against the bias of said spring means including an electromagnet energized by thermal electric current, and an armature connected with said valve, and engageable with said magnet for holding the valve open upon energization of said magnet, the connection between said armature and said valve comprising a spring affording relative movement between said armature and said valve and accommodating said valve to be moved to a closed position with said armature in engagement with said electromagnet.

3. In a flame safety and over temperature shut-off valve for gas burners, a valve body having a valve chamber therein, an inlet into said chamber, an outlet therefrom, a valve controlling the passage of gas from said inlet to said outlet, spring means biasing said valve into a closed position, magnet means holding said valve open including an electromagnet energized by thermal electric current and an armature connected wtih said valve and movable into engagement with said magnet to hold said valve open against the bias of said spring means when said magnet is energized, a thermostatic element for closing said valve upon over temperature conditions, and a spring releasably connecting said armature with said valve and accommodating said valve to be released from said armature by said thermostatic element upon over temperature conditions when said magnet is energized and said armature is held in engagement therewith by the magnetic attraction.

4. In a flame safety and over temperature shut-off valve for gas burners, a valve body having a valve chamber therein, an inlet into said chamber, an outlet therefrom, a valve controlling the passage of gas from said inlet to said outlet, spring means biasing said valve closed, magnet means holding said valve open and including an electromagnet energized by thermal electric current and an armature engageable with said electromagnet and having connection with said valve, said connection being releasable and accommodating the closing of said valve when said armature is held in engagement with said electromagnet by magnetic attraction, and a thermostatic element having a power operating member within said chamber, operable to release said releasable connection and accommodate said spring to move said valve to a closed position.

5. In a flame safety and over temperature shut-off valve for controlling the supply of fuel to a burner and the like, a valve body having a valve chamber therein, an inlet into said chamber, an outlet from said chamber, a valve in said chamber controlling the passage of gas from said inlet to said outlet, spring means biasing said valve to a closed position, magnetic means holding said valve in an open position against the bias of said spring means, a thermostatic element including a casing on the outside of said valve body and containing a fusible thermally expansible material, a flexible diaphragm closing an end of said casing and a power member engaging said diaphragm and extensible within said chamber upon fusion of the fusible material, a reset pin engageable with said valve to move said valve to an open position, said magnetic means including an electromagnet energized by thermal electric current, an armature held in engagement with said electromagnet upon energization thereof, and a releasable connection between said armature and said valve accommodating said power member to release said armature from said valve and accommodating said valve to be closed by the bias of its spring means when said armature is held in engagement with said electromagnet by magnetic attraction.

6. In a flame safety and over temperature shut off valve particularly adapted for fuel burners and the like, a valve body having a valve chamber therein, an inlet into said valve chamber, an outlet therefrom, a valve controlling the passage of gas from said inlet to said outlet, a valve stem extending from said valve and slidably guided in said chamber for axial movement with respect thereto, a spring encircling said valve stem and biasing said valve into closed position, an electromagnet energizable by thermal electric current, an armature attracted by said electromagnet and held in engagement therewith upon energization thereof, a spring releasably connecting said armature with said valve stem, a thermostatic element and a power member operated thereby in axial alignment with said valve stem for moving the same to release said spring from said armature upon predetermined over temperature conditions.

7. In a flame responsive and over temperature shut-off valve particularly adapted for gas burners, a valve casing having a valve chamber therein, an inlet into said valve chamber, an outlet therefrom, a valve controlling the passage of gas from said inlet to said outlet, a valve stem extending from said valve and slidably guided within said chamber for axial movement with respect thereto, a spring seated within said chamber and encircling said valve stem and having engagement with said valve to bias the same into a closed position, an electromagnet within said chamber, an armature releasably mounted on said stem, a reset pin engageable with said valve for opening the same and engaging said armature with said electromagnet, a thermostatic element closing an end of said valve chamber and comprising a casing containing a fusible thermally expansible material, and a power member extending within said chamber into engagement with said stem upon fusion of the fusible material to release said armature from said stem and accommodate closure of said valve.

8. In a flame safety and over temperature shut off valve particularly adapted for gas burners, a valve body having a valve chamber therein, an inlet into said chamber, an outlet therefrom, an annular valve seat in said chamber separating said inlet from said outlet, a valve within said chamber, a spring seated within said chamber and biasing said valve into engagement with said seat, a valve stem extending from said valve and guided for axial movement along said chamber, an armature having an apertured central portion in axial alignment with said stem, a spring extending along said stem within said apertured portion of said armature and having a rib engageable with said armature and releasably retaining the same to said stem, an electromagnet energizable by thermal electric current for holding said armature by magnetic attraction, and a thermostatic element having a power member extending within said chamber for engagement with said valve stem and releasing the same from said armature and accommodating said valve to close.

9. In a flame safety and over temperature shut-off valve particularly adapted for gas burners, a valve body having a valve chamber therein, an inlet into said chamber, an outlet therefrom, an annular valve seat in said chamber separating said inlet from said outlet, a valve within said chamber, spring means seated within said chamber and biasing said valve into engagement with said seat, a valve stem extending from said valve and guided for axial movement along said chamber, an armature having an apertured central portion in axial alignment with said stem, a U-shaped spring having parallel spaced legs extending along opposite sides of said stem and having ribs extending outwardly therefrom adjacent the outer end thereof, for engagement with the apertured portion of said armature and releasably attaching said armature to said valve stem for movement therewith, an electromagnet energized by thermal electric current for holding said armature from movement by magnetic attraction and holding said valve in an open position against the bias of said spring means, a thermostatic element, and a power member in axial alignment with said valve stem and actuated by said thermostatic element for releasing said armature from said valve stem and accommodating said valve to close.

10. In a flame safety and over temperature shut-off valve, a valve body having a valve chamber therein, an inlet into said valve chamber, an outlet therefrom, a valve controlling the passage of gas from said inlet to said outlet, a valve stem guided within said chamber and having said valve attached thereto, a spring seated within said chamber encircling said valve stem and biasing said valve into a closed position, an armature slidably movable along said valve stem, a spring encircling said valve stem and biasing said armature into engagement with said valve, an electromagnet energizable by thermal electric current, reset means for opening said valve against the bias of said first mentioned spring and for engaging said armature with said electromagnet to hold said valve in an open position upon energization of said electromagnet, a power type of thermostatic element closing an end of said chamber and having a flexible diaphragm extensible within said chamber, and an amplifying lever system comprising two levers operated by said diaphragm for moving said valve into a closed position while said armature is maintained in engagement with said electromagnet.

11. In a flame safety and over temperature shut-off valve, a valve body having a valve chamber therein, an inlet into said valve chamber, an outlet therefrom, a valve controlling the passage of gas from said inlet to said outlet, a sleeve slidably guided within said valve chamber, a spring biasing said sleeve into engagement with said valve and biasing said valve into a closed position, an armature secured to the end of said sleeve for movement therewith, a valve stem secured to said valve and extending through said sleeve and carried for axial movement with respect to said sleeve, a spring biasing said armature and valve for movement together, an electromagnet energizable by thermal electric current for holding said armature from movement by magnetic attraction and holding said valve in an open position, a power type of thermostatic element closing an end of said chamber, and a power member operated thereby for moving said valve with respect to said armature to a closed position upon over temperature conditions.

12. In a flame safety and over temperature shut-off valve, a valve body having a valve chamber therein, an inlet into said valve chamber, an outlet therefrom, a valve controlling the passage of gas from said inlet to said outlet, a sleeve slidably guided within said valve chamber, a spring biasing said sleeve into engagement with said valve and biasing said valve into a closed position, an armature secured to the end of said sleeve for movement therewith, a valve stem secured to said valve and extending through said sleeve and carried for axial movement with respect to said sleeve, a spring biasing said armature and valve for movement together, an electromagnet energizable by thermal electric current for holding said armature from movement by magnetic attraction and holding said valve in an open position, a power type of thermostatic element closing an end of said chamber and having a flexible diaphrapm extensible within said chamber, and an amplifying lever system connecting said diaphragm with said valve stem for closing said valve while said armature remains attracted to said electromagnet upon over temperature conditions, comprising a lever fulcrumed at one end, engaging said diaphragm intermediate its ends and having a bearing engaging surface at its outer end, a second lever fulcrumed at one end and engaging said bearing surface intermediate its ends and having a power member at its opposite end slidably guided in axial alignment with said valve stem, for positively moving said valve to a closed position.

References Cited in the file of this patent

UNITED STATES PATENTS

| | | |
|---|---|---|
| 2,267,347 | Betz | Dec. 23, 1941 |
| 2,383,401 | Mantz | Aug. 21, 1945 |
| 2,455,542 | Weber | Dec. 7, 1948 |